United States Patent [19]

Kojima

[11] 4,427,328

[45] Jan. 24, 1984

[54] PLASTIC FASTENER

[75] Inventor: Masaharu Kojima, Toyota, Japan

[73] Assignee: Nifco Inc., Yokohama, Japan

[21] Appl. No.: 298,683

[22] Filed: Sep. 2, 1981

[30] Foreign Application Priority Data

Sep. 22, 1980 [JP] Japan .................. 55-133656[U]

[51] Int. Cl.$^3$ .............................................. F16B 19/02
[52] U.S. Cl. ...................................... 411/508; 24/625
[58] Field of Search ................... 411/508, 509, 510; 24/213 R, 214, 297

[56] References Cited

U.S. PATENT DOCUMENTS 3,678,797  7/1972  Seckerson ........................ 411/509
3,810,279  5/1974  Swick et al. ...................... 411/509

Primary Examiner—Wayne L. Shedd
Attorney, Agent, or Firm—J. R. Halvorsen; T. W. Buckman

[57] ABSTRACT

A plastic fastener comprising a head portion to be contacted with a given panel, a leg portion to be inserted through a fitting hole bored in the panel, a plurality of fin-like engaging projections disposed in the stepped manner in the direction of the length on the outer surface of the leg portion is improved so as to be inserted in its correct posture through the fitting hole and brought into fast attachment without any play to the panel. The improvement is accomplished by providing the leg portion with at least two guide ridges having at each terminal edge thereof an engaging ridge.

1 Claim, 5 Drawing Figures

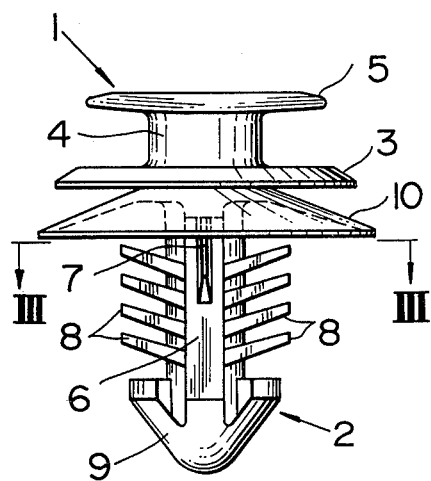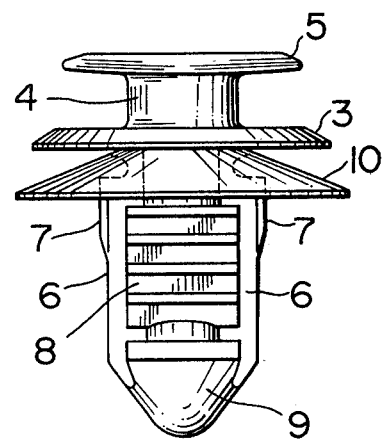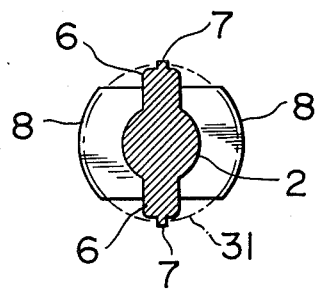

PLASTIC FASTENER

BACKGROUND OF THE INVENTION

This invention relates to a plastic fastener which is provided on its leg portion with stepped fin-like engaging projections and which, therefore, can be inserted with slight force into a fitting hole bored in a given panel and brought into powerful attachment without any play to the panel irrespective of the thickness of the panel.

A fastener which has a multiplicity of stepped engaging projections provided on a leg portion thereof so as to be attached fast to a fitting hole of a panel by virtue of the engaging projections has already been known to the art. The leg portion of this fastener having a multiplicity of engaging projections extended outwardly has the appearance of a Christmas tree. Thus, this fastener is generally called a Christmas tree type fastener or simply a tree type fastener. This fastener attains fast attachment to the panel by having one of the engaging projections caught fast on the edge of the fitting hole. The leg portion, therefore, acts as a common truck for supporting the engaging projections fast in position. The leg portion does not come into direct contact with the fitting hole. The fastener is constructed so as to secure fast attachment to the fitting hole only by means of the flexible engaging projections.

If the leg portion of this fastener is inclined during its insertion into the fitting hole, it is suffered to advance into the fitting hole and come into engagement with the fitting hole in the inclined posture. This problem entails a serious effect particularly when the fastener holds on the head portion thereof some other part fast in position. In the worst case, the fastener set in an inclined posture cannot be aligned with other parts and, consequently, fails to play the role of a fastener.

Moreover, since this fastener relies solely on the engaging projections for fast attachment to the fitting hole, there is a possibility that the fastener will be attached eccentrically to the fitting hole or, after attachment, will change its position relative to the fitting hole and will consequently be unstably attached to the fitting hole. This unstable fastening entails a problem that the fastener produces some play in the fitting hole.

Further, since the conventional fastener has the engaging projections extended perpendicularly from the leg portion, the force with which the fastener is inserted into the fitting hole equals the force with which the fastener already attached to the fitting hole is pulled out of the fitting hole. For the fastener to be retained powerfully in its attached position, namely for the fastener to offer ample resistance to the external force tending to pull the fastener out of the fitting hole, therefore, the force used for inserting the fastener into the fitting hole is inevitably required to be equally strong. Thus, the conventional fastener suffers from notably poor workability.

SUMMARY OF THE INVENTION

An object of the present invention is to provide a plastic fastener which is passed through a fitting hole in a given panel with great ease and is pulled out of the fitting hole with great difficulty so that the force required for the pulling-out is far greater than the force for the insertion and which is allowed to come into fast attachment to the panel with absolutely no play.

To accomplish the object described above according to the present invention, there is provided a plastic fastener which comprises a head portion, a leg portion extended downwardly from the lower side of the head portion, a plurality of fin-like engaging projections formed on the leg portion in stepped manner, guide ridges protruded from the outer surface of the leg portion in the longitudinal direction of the leg portion, and thin-walled engaging ridges formed at the terminal edges of the guide ridges.

While the leg portion of the fastener is inserted into the fitting hole bored in a given panel, the fin-like engaging projections on the outer surface of the leg portion permit ready advance of the leg portion through the fitting hole and do not permit the leg portion to move backward in the fitting hole. Consequently, the fastener can be brought into fast attachment to the panel.

Further, the guide ridges serve to fix the posture of the leg portion correctly during the insertion of the leg portion through the fitting hole. After the fastener has been brought into fast attachment to the panel, the engaging ridges prevent the leg portion from being moved in the transverse direction. Thus, the fastener is not allowed to produce any play in the fitting hole.

The other objects and characteristics of this invention will become apparent from the further disclosure of the invention to be made hereinafter with reference to the accompanying drawings.

BRIEF EXPLANATION OF THE DRAWINGS

FIGS. 1 and 2 are front view and a side view of the fastener of the present invention.

FIG. 3 is a sectional view taken along the line III—III of FIG. 1.

DESCRIPTION OF THE PREFERRED EMBODIMENT

Figure 4:
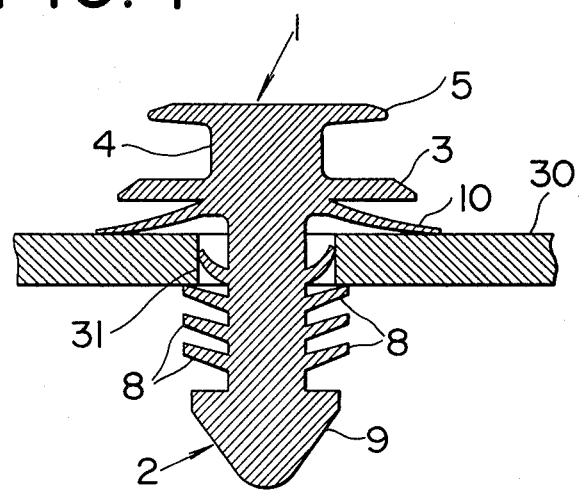
FIGS. 4 and 5 are a centrally sectioned front view and a side view of the fastener as held in a fixed state.

This invention relates to a tree type fastener which can be prevented from producing any play within the fitting hole bored in the panel in the fixed posture.

The head portion 1 of the fastener of the present embodiment consists of a disc-shaped flange 3, a shank 4 raised from the central portion of the upper side of the flange 3, and a smaller disc-shaped flange 5 formed at the upper end of the shank and opposed to the flange 3 across this shank. The leg portion 2 is formed so as to extend downwardly from the central portion of the lower side of the lower flange 3.

The leg portion 2 has an approximately cylindrical shape. It has a diameter smaller than that of a circular fitting hole 31 bored in a given panel 30 so as to facilitate the insertion of the leg portion into the fitting hole. This leg portion 2 is provided on the outer surface thereof with two guide ridges 6 protruded therefrom over the entire length of the leg portion. These guide ridges are provided at the terminal edges thereof with engaging ridges 7 having a thickness smaller than that of the guide ridges.

The protruded height of the guide ridges 6 is so selected that the length between the terminal edges of the guide ridges is slightly smaller than the diameter of the fitting hole 31 in the panel. Thus, when the leg portion 2 is inserted through the fitting hole 31, the guide ridges offers no interference with the advance of the leg portion in the fitting hole. Since the engaging ridges 7 protrude from the terminal edges of the guide ridges 6, the length between the terminal edges of these two engaging ridges 7 is slightly greater than the diameter of the fitting hole 31. During the insertion of the leg portion into the fitting hole, these engaging ridges are either crushed against the edge of the fitting hole or rubbed and scraped by the edge to be deprived of excess portions thereof.

The leg portion 2 with the guide ridges 6 and engaging ridges 7 is further provided on the portions of the outer surface thereof devoid of these ridges with a plurality of engaging projections 8 disposed in the stepped manner in the longitudinal direction of the leg portion. The leg portion 2 is also provided at the leading end thereof with a cone-shaped guide portion 9 which serves to guide the insertion of the leg portion. Further, at the basal end thereof contiguous to the head portion 1, the leg portion 2 is provided with a resilient flange 10 of the shape of an umbrella diverging in the downward direction.

In the present embodiment, since the leg portion 2 has the two guide ridges 6 protruded in the diametrically opposite directions away from the leg portion, the engaging projections 8 thrust out in the opposite directions are separated by the guide ridges 6. The leading ends of these engaging projections 8 are slanted upwardly.

The engaging projections 8 thrust out in the opposite directions are disposed in the stepped manner by a fixed interval in the direction of the length of the leg portion. They are molded so that the forward edges thereof are curved in the shape of arcs conforming to the shape of the fitting hole 31 and, at the same time, the forward edges of the engaging projections 8 fall outside the circumference of the fitting hole.

FIG. 3 clarifies the relation among the leg portion 2, the guide ridges 6 protruded from the leg portion 2, the engaging ridges 7 protruded from the terminal edges of the guide ridges 6, and the engaging projections 8 thrust out laterally relative to the guide ridges 6. It further illustrates the relation between these components and the fitting hole 31. It will be noted from this diagram that when the axis of the leg portion 2 coincides with that of the fitting hole 31, the guide ridges 6 are received in the fitting hole with their terminal edges substantially held in intimate contact with the edge and the opposite engaging projections 8 fall outside the edge of the fitting hole.

Figure 5:
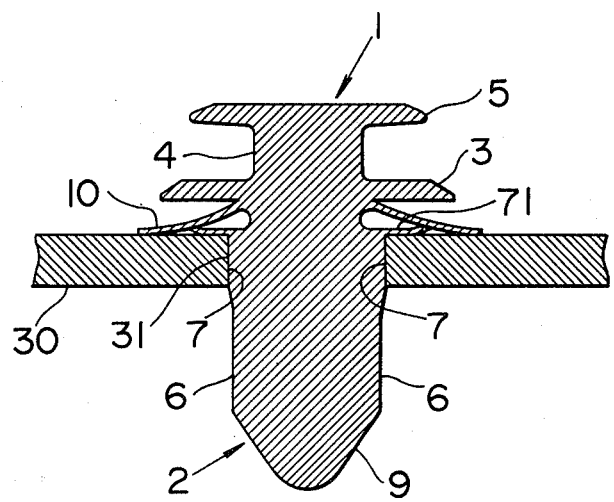

The fastener of the present invention comprising the head portion 1 and the leg portion 2 as described above is integrally molded of a thermoplastic synthetic resin which combines rigidity and resilience as required. The use of this fastener is accomplished by inserting the leg portion 2 into the fitting hole 31 formed in the panel 30 and giving a push to the leg portion 2 until the lower side of the head portion 1, i.e. the lower side of the resilient flange 10 in the illustrated embodiment, comes into intimate contact with the surface of the panel as illustrated in FIGS. 4 and 5.

In the process of this insertion, the leg portion 2 with the guide ridges 6 is advanced along the axis of the fitting hole 31 as guided by the guide ridges 6. In the meantime, the engaging projections 8 being larger in diameter than the fitting hole 31 slide past the fitting hole as bent backwardly by the edge of the fitting hole. The advance of the leg portion in the fitting hole stops at the time that the resilient flange 10 collides with the panel and is somewhat pushed open, thereby accomplishing the fast attachment of the fastener to the panel. At this time, the engaging ridges 7 on the guide ridges 6 are either contorted by the pressure exerted by the edge of the fitting hole 31, or, as illustrated in FIG. 5, scraped by the edge of the fitting hole to be deprived of excess portions 71. Thus, the engaging ridges 7 force their way into the fitting hole 31 and fill up the gap between the guide ridges 6 and the inner wall of the edge of the fitting hole. At the same time, the last pair of engaging projections 8 which have passed through the fitting hole 31 come into fast engagement with the edge of the fitting hole and prevent the leg portion from being pulled out of the fitting hole.

In the use of the fastener of this invention, therefore, the engaging projections thrust out in opposite directions can be brought into perfectly balanced engagement with the edge of the fitting hole because the leg portion 2 is always inserted along the axis of the fitting hole under the guidance provided by the guide ridges 6. Insomuch as the fastener is not allowed to be inserted in an inclined position and brought into fast attachment to the panel in that posture, the fastener can be fastened stably to the panel. Even after the fastener has been attached fast to the panel, the guide ridges 6 remain in intimate contact with the edge of the fitting hole and prevent the fastener from being moved laterally relative to the fitting hole. Thus, the fastener does not entail partial breakage of the fast attachment of its engaging projections 8 under any conditions. It can be expected to provide safe, reliable attachment.

The leg portion 2 held inside the fitting hole is not allowed to produce any play because the engaging ridges 7 on the guide ridges 6 resiliently remain in fast contact with the edge of the fitting hole and fill up the gap between the guide ridges and the fitting hole. The fastener, therefore, proves highly convenient when some other part is held fast in position through the medium of the head portion 1 thereof.

The fastener of this invention has another advantage that it enjoys notably improved workability as compared with the conventional fastener, because the engaging projections 8 are disposed with their leading ends slanted toward the head portion side so that the insertion of the fastener into the fitting hole is obtained with slight force and the extraction of the fastener from the fitting hole is obtained with great force.

The resilient flange 10 involved in the embodiment described above serves to nip the panel in cooperation with the engaging projections 8 and, accordingly, contributes to enhance the stability of the attachment of this fastener to the panel.

The embodiment so far described represents a case wherein two guide ridges 6 are formed in the diametrically opposite positions on the leg portion. As is clear from the description given above, it is optional to increase the number of guide ridges 6 to three or more so far as they fulfil their function of causing the leg portion 2 to assume its position along the axis of the fitting hole. When the number is increased, it is desirable that the guide ridges 6 should be spaced at a fixed circumferential distance and, as a result, the engaging projections 8 should be disposed on the portions of the outer surface of the leg portion devoid of the guide ridges 6.

The head portion 1 of this fastener may be simply in the shape of a flange where the fastener is intended to join two panels face to face to each other. Where the fastener is expected to fulfil an additional function of allowing some other part to be fastened thereto, a smaller flange may be formed opposite the large flange through the medium of the shank as in the illustrated embodiment. In this arrangement, some other part may be fastened by utilizing the circular depression formed by the smaller flange and the shank. Thus, the head portion may be freely designed to suit the particular purpose for which the fastener is used.

What is claimed is:

1. In a plastic fastener comprising a head portion adapted to come into contact with one surface of a given panel, a leg portion of predetermined diameter extended downwardly from the lower side of said head portion and adapted to be inserted through a fitting hole bored in advance in said panel, and a multiplicity of engaging projections of greater transverse dimension than said predetermined diameter disposed in stepped manner on said leg portion at regular intervals in the direction of the length of the leg portion, the improved plastic fastener comprising at least two guide ridges radially protruded in opposite directions from said leg portion along the length of the leg portion, said projections being joined to said leg portion and to said guide ridge, of predetermined thickness and provided at the terminal edges thereof with engaging ridges of a small thickness relative to said predetermined thickness, said engaging projections being disposed on the leg portion devoid of said guide ridges, and said engaging projections being disposed so as to be slanted toward the head portion.

* * * * *